(12) United States Patent
Akerman et al.

(10) Patent No.: US 7,912,865 B2
(45) Date of Patent: Mar. 22, 2011

(54) SYSTEM AND METHOD FOR LINKING MULTIPLE ENTITIES IN A BUSINESS DATABASE

(75) Inventors: Kevin J. Akerman, Ladera Ranch, CA (US); Denise S. Hopkins, Huntington Beach, CA (US)

(73) Assignee: Experian Marketing Solutions, Inc., Schaumberg, IL (US)

( * ) Notice: Subject to any disclaimer, the term of this patent is extended or adjusted under 35 U.S.C. 154(b) by 531 days.

(21) Appl. No.: 11/862,086

(22) Filed: Sep. 26, 2007

(65) Prior Publication Data

US 2008/0077551 A1 Mar. 27, 2008

Related U.S. Application Data

(60) Provisional application No. 60/847,177, filed on Sep. 26, 2006.

(51) Int. Cl.
*G06F 17/30* (2006.01)
(52) U.S. Cl. .......................... 707/802; 707/899; 705/35
(58) Field of Classification Search .................. None
See application file for complete search history.

(56) References Cited

U.S. PATENT DOCUMENTS

| | | | |
|---|---|---|---|
| 4,827,508 A | 5/1989 | Shear | |
| 4,868,570 A | 9/1989 | Davis | |
| 4,935,870 A | 6/1990 | Burk, Jr. et al. | |
| 5,247,575 A | 9/1993 | Sprague et al. | |
| 5,325,509 A | 6/1994 | Lautzenheiser | |
| 5,341,429 A | 8/1994 | Stringer et al. | |
| 5,528,701 A | 6/1996 | Aref | |
| 5,555,409 A | 9/1996 | Leenstra, Sr. et al. | |
| 5,640,551 A | 6/1997 | Chu et al. | |
| 5,655,129 A | 8/1997 | Ito | |
| 5,666,528 A | 9/1997 | Thai | |
| 5,737,732 A | 4/1998 | Gibson et al. | |
| 5,768,423 A | 6/1998 | Aref et al. | |
| 5,774,692 A | 6/1998 | Boyer et al. | |
| 5,778,405 A | 7/1998 | Ogawa | |
| 5,797,136 A | 8/1998 | Boyer et al. | |
| 5,812,840 A | 9/1998 | Shwartz | |
| 5,822,750 A | 10/1998 | Jou et al. | |
| 5,822,751 A | 10/1998 | Gray et al. | |
| 5,835,915 A | 11/1998 | Carr et al. | |

(Continued)

FOREIGN PATENT DOCUMENTS

EP 0419889 A2 4/1991

(Continued)

OTHER PUBLICATIONS

PCT/US2007/079576—PCT International Search Report and Written Opinion dated Mar. 7, 2008, in 15 pages.

(Continued)

*Primary Examiner* — Tim T. Vo
*Assistant Examiner* — Anh Tai V Tran
(74) *Attorney, Agent, or Firm* — Knobbe, Martens, Olson & Bear, LLP

(57) ABSTRACT

Embodiments of a system and method are described for determining whether an applicant is a multiple-business owner and for providing information related to multiple-business owners to a financial service provider or other client. According to one embodiment, a computing system is provided to collect and store business data and identify business owners associated with multiple business records.

18 Claims, 12 Drawing Sheets

U.S. PATENT DOCUMENTS

| | | | |
|---|---|---|---|
| 5,905,985 | A | 5/1999 | Malloy et al. |
| 5,963,932 | A | 10/1999 | Jakobsson et al. |
| 6,073,140 | A | 6/2000 | Morgan et al. |
| 6,121,901 | A | 9/2000 | Welch et al. |
| 6,128,624 | A | 10/2000 | Papierniak et al. |
| 6,144,957 | A | 11/2000 | Cohen et al. |
| 6,151,601 | A | 11/2000 | Papierniak et al. |
| 6,157,927 | A | 12/2000 | Schaefer et al. |
| 6,223,171 | B1 | 4/2001 | Chaudhuri et al. |
| 6,256,630 | B1 | 7/2001 | Gilai et al. |
| 6,263,337 | B1 | 7/2001 | Fayyad et al. |
| 6,304,869 | B1 | 10/2001 | Moore et al. |
| 6,321,205 | B1 | 11/2001 | Eder |
| 6,339,769 | B1 | 1/2002 | Cochrane et al. |
| 6,366,903 | B1 | 4/2002 | Agrawal et al. |
| 6,393,406 | B1 | 5/2002 | Eder |
| 6,496,819 | B1 | 12/2002 | Bello et al. |
| 6,523,022 | B1 | 2/2003 | Hobbs |
| 6,523,041 | B1 | 2/2003 | Morgan et al. |
| 6,574,623 | B1 | 6/2003 | Leung et al. |
| 6,651,220 | B1 | 11/2003 | Penteroudakis et al. |
| 6,748,426 | B1 | 6/2004 | Shaffer et al. |
| 6,766,327 | B2 | 7/2004 | Morgan et al. |
| 6,804,701 | B2 | 10/2004 | Muret et al. |
| 7,003,504 | B1 | 2/2006 | Angus et al. |
| 7,028,052 | B2 | 4/2006 | Chapman et al. |
| 7,082,435 | B1 | 7/2006 | Guzman et al. |
| 7,185,016 | B1 | 2/2007 | Rasmussen |
| 7,188,169 | B2 | 3/2007 | Buus et al. |
| 7,240,059 | B2 | 7/2007 | Bagliss et al. |
| 7,277,900 | B1 | 10/2007 | Ganesh et al. |
| 7,383,215 | B1 | 6/2008 | Navarro et al. |
| 7,467,127 | B1 | 12/2008 | Baccash |
| 7,647,344 | B2 | 1/2010 | Skurtovich et al. |
| 7,657,540 | B1 * | 2/2010 | Bayliss ................................ 1/1 |
| 7,668,840 | B2 | 2/2010 | Bayliss et al. |
| 2001/0037332 | A1 | 11/2001 | Miller et al. |
| 2002/0026507 | A1 | 2/2002 | Sears et al. |
| 2002/0052884 | A1 | 5/2002 | Farber et al. |
| 2002/0103809 | A1 | 8/2002 | Starzl et al. |
| 2002/0133504 | A1 | 9/2002 | Vlahos et al. |
| 2002/0138297 | A1 | 9/2002 | Lee |
| 2002/0173984 | A1 | 11/2002 | Robertson et al. |
| 2002/0184255 | A1 | 12/2002 | Edd et al. |
| 2002/0198824 | A1 | 12/2002 | Cook |
| 2003/0018549 | A1 | 1/2003 | Fei et al. |
| 2003/0083893 | A1 | 5/2003 | Aliffi et al. |
| 2003/0097380 | A1 | 5/2003 | Mulhern et al. |
| 2003/0101344 | A1 | 5/2003 | Wheeler et al. |
| 2003/0171942 | A1 | 9/2003 | Gaito |
| 2003/0220858 | A1 | 11/2003 | Lam et al. |
| 2004/0153448 | A1 | 8/2004 | Cheng et al. |
| 2004/0221043 | A1 | 11/2004 | Su et al. |
| 2004/0225596 | A1 | 11/2004 | Kemper et al. |
| 2004/0243539 | A1 * | 12/2004 | Skurtovich et al. ................ 707/1 |
| 2004/0243588 | A1 | 12/2004 | Tanner et al. |
| 2005/0154664 | A1 | 7/2005 | Guy et al. |
| 2006/0229799 | A1 | 10/2006 | Nimmo et al. |
| 2006/0294199 | A1 | 12/2006 | Bertholf |
| 2007/0226093 | A1 | 9/2007 | Chan et al. |

FOREIGN PATENT DOCUMENTS

| | | |
|---|---|---|
| EP | 0458698 A2 | 11/1991 |
| EP | 0559358 A2 | 9/1993 |
| EP | 0977128 A1 | 2/2000 |
| EP | 0772836 B1 | 12/2001 |
| WO | WO 95/34155 | 12/1995 |
| WO | WO 96/00945 | 1/1996 |
| WO | WO 98/41931 | 9/1998 |
| WO | WO 98/41932 | 9/1998 |
| WO | WO 98/41933 | 9/1998 |
| WO | WO 99/17225 | 4/1999 |
| WO | WO 99/17226 | 4/1999 |
| WO | WO 99/38094 | 7/1999 |
| WO | WO 00/04465 | 1/2000 |
| WO | WO 00/11574 | 3/2000 |
| WO | WO 00/28441 | 5/2000 |

OTHER PUBLICATIONS

U.S. Appl. No. 12/705,489, mailed Feb. 12, 2010, Bargoli et al.
U.S. Appl. No. 12/705,511, mailed Feb. 12, 2010, Bargoli et al.
Elmasri et al., "Fundamentals of Database Systems, Third Edition (Excerpts)," Jun. 2000, pp. 253, 261, 268-270, 278-280, 585, 595.
Various Posts from 2003 and 2004 at http://web.archive.org/web/2005045221950/http://p2p.wrox.com/topic.asp?TOPIC_ID=6513.
Web Page posted at: http://web.archive.org/web20040805124909/http://www.oracle.com/technology/sample_codete/tech/pl_sql/htdocs/x/Case/start.htm, pp. 1 and 4 of the webs page posted on Jan. 7, 2003.
Office Action dated Jun. 8, 2006 in U.S. Appl. No. 10/651,469.
Response to Office Action dated Nov. 13, 2006 in U.S. Appl. No. 10/651,469.
Office Action dated Feb. 2, 2007 in U.S. Appl. No. 10/651,469.
Response to Office Action dated Aug. 1, 2007 in U.S. Appl. No. 10/651,469.
Office Action dated Aug. 24, 2007 in U.S. Appl. No. 10/651,469.
Response to Office Action dated Dec. 26, 2007 in U.S. Appl. No. 10/651,469.
Office Action dated Mar. 25, 2008 in U.S. Appl. No. 10/651,469.
Response to Office Action dated Aug. 25, 2008 in U.S. Appl. No. 10/651,469.
Office Action dated Dec. 1, 2008 in U.S. Appl. No. 10/651,469.
Response to Office Action dated May 30, 2009 in U.S. Appl. No. 10/651,469.
Notice of Allowance dated Aug. 19, 2009 in U.S. Appl. No. 10/651,469.
Post Allowance Amendments dated Nov. 17, 2009 in U.S. Appl. No. 10/651,469.
Office Action dated Dec. 9, 2009 in U.S. Appl. No. 10/651,469.

* cited by examiner

| DATA FIELD | VALUE |
|---|---|
| Business Identification Number | 12345678901234 |
| Business Name | KNOBBE MARTENS OLSON AND BEAR |
| Business Address | 2040 MAIN STREET |
| Business Unit Type | STE |
| Business Number | 1400 |
| Business City | IRVINE |
| ZIP | 92614 |
| ZIP + 4 | 7216 |
| County Name | ORANGE |
| County Code | |
| Carrier Route | |
| Metropolitan Statistical Area Code | 5945 |
| MSA Description | ORANGE COUNTY, CA |
| Primary Phone Number | 9497600404 |
| Primary Standard Industrial Classification Code | 8111-98 |
| Primary SIC Code Description | LEGAL SERVICES |
| Employee Size Code at Location | G |
| Annual Sales Size Code at Location | U |
| Years in Business Code | F |
| Legal Business Structure | P |
| Business Owner ID | 1234567890 |
| Business Owner First Name | LOUIS |
| Business Owner Middle Name | J |
| Business Owner Last Name | KNOBBE |
| Business Owner Home Address | 550 WEST C STREET |
| Business Owner Home City | SAN DIEGO |
| Business Owner Home State | CA |
| Business Owner Home Zip Code | 92101 |
| * | |
| * | |
| * | |
| CREDIT RISK | LOW |

- 301: Business Identification Number
- 302: Business Name
- 303: Business Address through MSA Description
- 304: Primary Phone Number through Legal Business Structure
- 305: Business Owner ID
- 306: Business Owner First/Middle/Last Name
- 307: Business Owner Home Address/City/State/Zip Code
- 308: CREDIT RISK

FIGURE 3A

| DATA FIELD | VALUE |
|---|---|
| Business Identification Number | 09876543210987 |
| Business Name | KNOBBE MARTENS |
| Business Address | ONE SANSOME STREET |
| Business Unit Type | STE |
| Business Number | 3500 |
| Business City | SAN FRANCISCO |
| ZIP | 94104 |
| ZIP + 4 | 4448 |
| County Name | SAN FRANCISCO |
| County Code | |
| Carrier Route | |
| Metropolitan Statistical Area Code | 7360 |
| MSA Description | SAN FRANCISCO, CA |
| Primary Phone Number | 4159544114 |
| Primary Standard Industrial Classification Code | 8111-98 |
| Primary SIC Code Description | LEGAL SERVICES |
| Employee Size Code at Location | D |
| Annual Sales Size Code at Location | U |
| Years in Business Code | F |
| Legal Business Structure | P |
| Business Owner ID | 1234567890 |
| Business Owner First Name | LOUIS |
| Business Owner Middle Name | J |
| Business Owner Last Name | KNOBBE |
| Business Owner Home Address | 550 WEST C STREET |
| Business Owner Home City | SAN DIEGO |
| Business Owner Home State | CA |
| Business Owner Home Zip Code | 92101 |
| ⁎ ⁎ ⁎ | |
| CREDIT RISK | LOW |

FIGURE 3B

| DATA FIELD | VALUE |
|---|---|
| Business Identification Number | 11223344556677 |
| Business Name | KNOBBE ICE CREAM TREATS |
| Business Address | 1 BROADWAY STREET |
| Business Unit Type | |
| Business Number | |
| Business City | LAGUNA BEACH |
| ZIP | 92651 |
| ZIP + 4 | 1807 |
| County Name | ORANGE |
| County Code | |
| Carrier Route | |
| Metropolitan Statistical Area Code | 5945 |
| MSA Description | ORANGE COUNTY, CA |
| Primary Phone Number | 949-555-0000 |
| Primary Standard Industrial Classification Code | 5812 |
| Primary SIC Code Description | EATING PLACES |
| Employee Size Code at Location | A |
| Annual Sales Size Code at Location | A |
| Years in Business Code | C |
| Legal Business Structure | S |
| Business Owner ID | 1234567890 |
| Business Owner First Name | LOU |
| Business Owner Middle Name | |
| Business Owner Last Name | CANOBEE |
| Business Owner Home Address | 550 WEST C STREET |
| Business Owner Home City | SAN DIEGO |
| Business Owner Home State | CA |
| Business Owner Home Zip Code | 92101 |
| | * |
| | * |
| | * |
| CREDIT RISK | UNKNOWN |

FIGURE 3C

| Attribute | Count | Records Dropped | % Remaining | Drop Criteria |
|---|---|---|---|---|
| BIN | 100,000 | 0 | 100.00 | |
| Business Name | 99,800 | 200 | 99.80 | Business Names are the same |
| Tax Id | 99,500 | 300 | 99.50 | Same Tax Ids and no other match factors |
| Start Year, SIC, Phone | 98,500 | 1,000 | 98.50 | No Tax Id; Same Start Year, SIC, Phone |
| SIC Code, Phone | 98,000 | 500 | 98.00 | No Tax Id; Same SIC and Phone |
| Start Year, Phone | 97,300 | 700 | 97.30 | No Tax Id; Same Start Year and Phone |
| Start Year, SIC Code | 96,900 | 400 | 96.90 | No Tax Id; Same Start Year and SIC |
| TOTAL | 100,000 | 3,100 | 96.90 | |

Figure 9

| No. of Businesses per Business Owner | No. of Owners | Total Businesses |
|---|---|---|
| 2 Businesses | 15,000 | 30,000 |
| 3 Businesses | 2,000 | 6,000 |
| 4 Businesses | 1,500 | 6,000 |
| 5 Businesses | 1,000 | 5,000 |
| 6 Businesses | 3,000 | 18,000 |
| 7 Businesses | 5,000 | 35,000 |
| TOTAL | 27,500 | 100,000 |

Figure 10

SYSTEM AND METHOD FOR LINKING MULTIPLE ENTITIES IN A BUSINESS DATABASE

CROSS-REFERENCE TO RELATED APPLICATIONS

This application is based upon and claims the benefit of priority from U.S. Provisional Patent Application No. 60/847,177 filed on Sep. 26, 2006, the entire contents of which are incorporated herein by reference. All publications and patent applications mentioned in this specification are herein incorporated by reference to the same extent as if each individual publication or patent application was specifically and individually indicated to be incorporated by reference.

TECHNICAL FIELD

This disclosure generally relates to financial data processing, and more particularly to improved methods and systems for identifying multiple businesses owned by a single ownership entity.

DESCRIPTION OF RELATED ART

Various financial service providers provide credit accounts such as mortgages, automobile loans, credit card accounts, and the like, to consumers and businesses. In determining whether to extend credit to an applicant and under what terms, the financial service providers may rely upon financial data related to the credit activities, current assets, and current liabilities of the consumer. Commonly, this information is provided in the form of a credit score or with a report.

SUMMARY OF DISCLOSURE

A system is described to provide additional relevant information to a financial service provider in order to allow that provider to make improved decisions. According to one embodiment, the system determines whether an applicant owns multiple businesses and provides information related to those businesses. Throughout this disclosure, a single ownership entity that owns more than one business is referred to as a multiple-business owner.

Multiple-business owners may be inaccurately characterized in traditional credit reports. For example, an individual applying for a business loan for a first business may have little or no credit history with that business. As a result, a traditional credit score or report may indicate that the individual is a significant risk, which may limit the terms of any credit offers. If the individual owns several other businesses that have good credit histories or significant assets, that individual may actually be significantly less of a risk than the traditional report indicates. Advantageously, certain embodiments allow a financial service provider to find other businesses owned by a multiple-business owner in order to more accurately assess the level of risk associated with that applicant. Of course, the opposite situation may occur as well. If an individual that appears to have good credit is found to own several businesses that have failed to make payments, defaulted, or otherwise engaged in negative credit activities, then the financial service provider may be able to determine that fact and adjust its credit offerings accordingly.

Accordingly, embodiments of a system and method are described for determining whether an applicant is a multiple-business owner and for providing information related to multiple-business owners to a financial service provider or other client. According to one embodiment, business data is collected from one or more sources, and business records are stored. Business owners are associated with each business record. Those business owners associated with multiple business records are identified as potential multiple-business owners. Business records are compared with other records associated with the same ownership entity, and are filtered to remove multiple records identifying the same business. Multiple records may identify the same business when, for example, a business has multiple locations or has multiple "doing business as" names. The filtered records are stored in a database of multiple-business records. The financial service provider may request information related to one or more applicants. The serve provider's request is matched with the database of stored multiple-business records, and a report is provided to the financial service provider identifying whether the applicants are multiple-business owners and credit data related to the additional businesses.

According to some embodiments, a computer implemented method for filtering a business database comprising a plurality of records to determine which of the records correspond to multiple business entities having a common business owner is disclosed. The method comprises accessing the business database and selecting one of the plurality of records that is associated with a business owner. It is determined whether any of the other records are associated with the business owner, and the selected record and each of the other records determined to be associated with the business owner are extracted if it is determined that there are other records associated with the business owner. The selected record is dropped if it is determined that there are no other records associated with the business owner. These steps may be repeated for each of the records until each of the records have been extracted or dropped. A multiple-business owner data set is generated from the extracted records and at least a portion of the multiple-business owner data set is delivered to a client.

According to some embodiments, a computing system is disclosed. The computing system comprises a business database comprising a plurality of business records. The business records comprises a business owner field and at least one identifying field. A multiple-business owner filter is provided that is configured to access the business database and select a subset of the plurality of business records that have recurring business owner fields. The system further comprises a false-positive filter configured to access the subset and identify multiple-business owner records based at least in part on the at least one identifying field. The system additionally comprises a multiple-business owner link database configured to store the multiple-business owner records identified by the false-positive filter.

These and additional embodiments are discussed in greater detail below. Numerous other advantages and features of the present invention will become readily apparent from the following detailed description of the invention and the embodiments thereof, from the claims and from the accompanying drawings.

BRIEF DESCRIPTION OF THE DRAWINGS

The objects, features and advantages of the present invention will be more readily appreciated upon reference to the following disclosure when considered in conjunction with the accompanying drawings and examples which form a portion of the specification, in which:

FIGS. 3A-C are examples of related business data entries in a business identification database according to one embodiment;

FIG. 9 is a report showing the number of records dropped and the drop criteria according to one embodiment; and FIG. 10 is a report showing the distribution of businesses per business owner according to one embodiment.

DETAILED DESCRIPTION

Embodiments of the invention will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Figure 1:
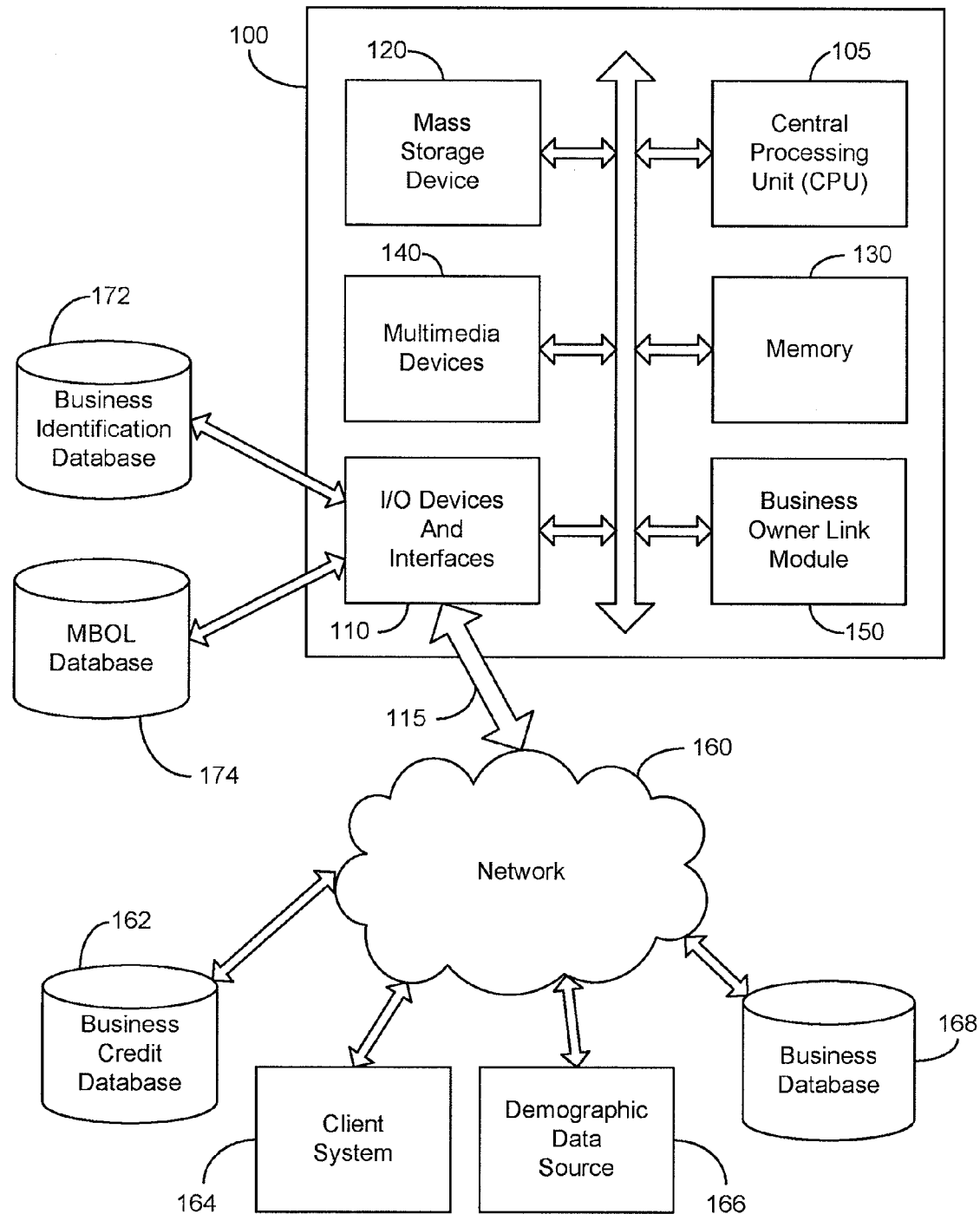
FIG. 1 is a block diagram of a system for linking multiple businesses owned by a single entity according to one embodiment.

FIG. 1 is one embodiment of a block diagram of a computing system 100 that is in communication with a network 160 and various systems that are also in communication with the network 160. The computing system 100 may be used to implement certain systems and methods described herein. For example, the computing system 100 may be configured to receive financial and demographic information regarding individuals and generate reports and/or alerts for one or more clients. Although the description provided herein refers to individuals, consumers, or customers, the terms "individual," "consumer," and "customer" should be interpreted to include applicants, or groups of individuals or customers or applicants, such as, for example, married couples or domestic partners, and business entities. The functionality provided for in the components and modules of computing system 100 may be combined into fewer components and modules or further separated into additional components and modules.

The computing system 100 includes, for example, a personal computer that is IBM, Macintosh, or Linux/Unix compatible. In one embodiment, the computing system 100 comprises a server, a laptop computer, a cell phone, a personal digital assistant, a kiosk, or an audio player, for example. In one embodiment, the exemplary computing system 100 includes a central processing unit ("CPU") 105, which may include a conventional microprocessor. The computing system 100 further includes a memory 130, such as random access memory ("RAM") for temporary storage of information and a read only memory ("ROM") for permanent storage of information, and a mass storage device 120, such as a hard drive, diskette, or optical media storage device. Typically, the modules of the computing system 100 are connected to the computer using a standards based bus system. In different embodiments, the standards based bus system could be Peripheral Component Interconnect ("PCI"), Microchannel, SCSI, Industrial Standard Architecture ("ISA") and Extended ISA ("EISA") architectures, for example.

The computing system 100 is generally controlled and coordinated by operating system software, such as Windows 95, Windows 98, Windows NT, Windows 2000, Windows XP, Windows Vista, Linux, SunOS, Solaris, or other compatible operating systems. In Macintosh systems, the operating system may be any available operating system, such as MAC OS X. In other embodiments, the computing system 100 may be controlled by a proprietary operating system. Conventional operating systems control and schedule computer processes for execution, perform memory management, provide file system, networking, I/O services, and provide a user interface, such as a graphical user interface ("GUI"), among other things.

The exemplary computing system 100 includes one or more commonly available input/output (I/O) devices and interfaces 110, such as a keyboard, mouse, touchpad, and printer. In one embodiment, the I/O devices and interfaces 110 include one or more display device, such as a monitor, that allows the visual presentation of data to a user. More particularly, a display device provides for the presentation of GUIs, application software data, and multimedia presentations, for example. The computing system 100 may also include one or more multimedia devices 140, such as speakers, video cards, graphics accelerators, and microphones, for example.

In the embodiment of FIG. 1, the I/O devices and interfaces 110 provide a communication interface to various external devices. In the embodiment of FIG. 1, the computing system 100 is coupled to a network 160, such as a LAN, WAN, or the Internet, for example, via a wired, wireless, or combination of wired and wireless, communication link 115. The network 160 communicates with various computing devices and/or other electronic devices via wired or wireless communication links.

According to FIG. 1, information is provided to computing system 100 over the network 160 from one or more data sources including, for example, one or more of the business credit database 162, the client 164, the demographic data source 166, and the business database 168. The information supplied by the various data sources may include credit data, demographic data, application information, product terms, accounts receivable data, and financial statements, for example. In addition to the devices that are illustrated in FIG. 1, the network 160 may communicate with other data sources or other computing devices. In addition, the data sources may include one or more internal and/or external data sources. In some embodiments, one or more of the databases or data sources may be implemented using a relational database, such as Sybase, Oracle, CodeBase and Microsoft® SQL Server as well as other types of databases such as, for example, a flat file database, an entity-relationship database, and object-oriented database, and/or a record-based database.

According to some embodiments, the business credit database 162 comprises data obtained from various data sources, including but not limited to tradeline data, public records data, and external client data 240. In addition, the data may include externally stored and/or internally stored data. In other embodiments, the business credit database 162 comprises only a subset of the data available from the various data sources set forth above. Credit data obtained from business credit database 162 may be combined, verified, or otherwise utilized in conjunction with business database 168 in order to populate business identification database 172.

In addition to supplying data, client 164 may further request information from the computing system 100. For example, the client 164 may request data related to multiple businesses owned by a single ownership entity. Such a request may include consumer information identifying the ownership entity for which information is desired.

Business database 168 may comprise, for example, a national business database as well as other available collections of business data. The national business database comprises approximately 18 million records. The records comprise business data (for example, name, address, size, industry, etc.) and credit data (for example, credit score, activity, etc.).

The I/O devices and interfaces 110 further provide a communication interface to a business identification database 172 and a multiple-business owner link ("MBOL") database 174. The computing system 100 may be coupled to a secured network, such as a secured LAN, that communicates with the business identification database 172 and the MBOL database 174. In some embodiments, the business identification database 172 and the MBOL database 174 are configured to communicate with additional computing devices over the network 160 or some other network, such as a LAN, WAN, or the Internet via a wired, wireless, or combination of wired and wireless, communication link. In certain embodiments, the client 164 may have access to the business identification database 172 and the MBOL database 174 through the network 160, and/or a secured network.

In the embodiment of FIG. 1, the computing system 100 also includes a business owner link module 150 that may be executed by the CPU 105. This module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In the embodiment shown in FIG. 1, the computing system 100 is configured to execute the business owner link module 150, among others, in order to determine associations between businesses owned by a single ownership entity. Business owner link module 150 is further configured to access the business database 168, along with additional sources of information. Records in the business database are accessed, appended with at least business owner information (for example, a business owner ID), and stored in the business identification database 172. These records are accessed by the business owner link module 150 to determine which records correspond to multiple business records, as will be described in more detail below.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

Figure 2A:
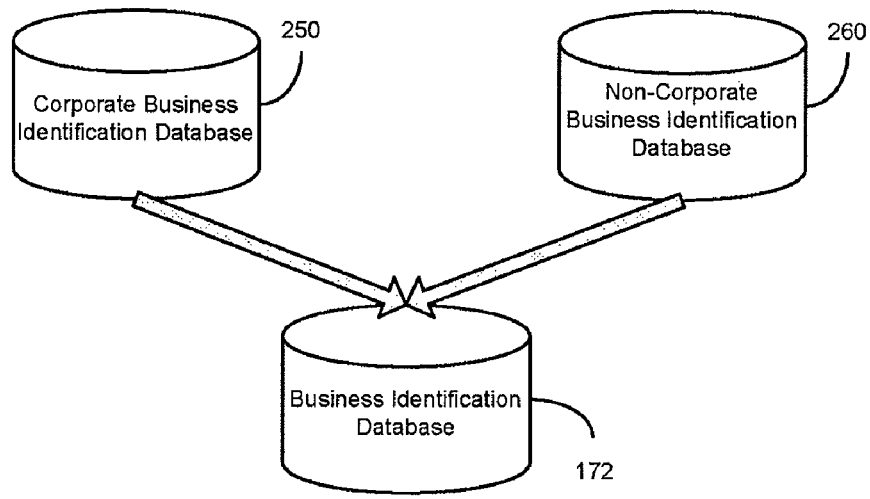
FIG. 2A shows sources of business data in a business identification database according to one embodiment.

FIG. 2A shows a diagram illustrating that in one embodiment the business identification database 172 comprises business data obtained from a corporate business identification database 250 and from a non-corporate business identification database 260. In some embodiments, corporate business data records may comprise different or additional data fields as compared to non-corporate records. A skilled artisan will understand that the processes described herein may be modified to accommodate different forms of ownership, such as sole proprietorships, partnerships, corporations, or the like. Records in the business identification database 172 (and in the corporate and non-corporate business identification databases 250 and 260) may be obtained from, for example, the business database 168. Additional data may be obtained from other sources such as the business credit database 162, client 164, demographic database 166, or some other source as described above. Some or all of these data sources may also be segmented to distinguish corporate and non-corporate data.

Figure 2B:
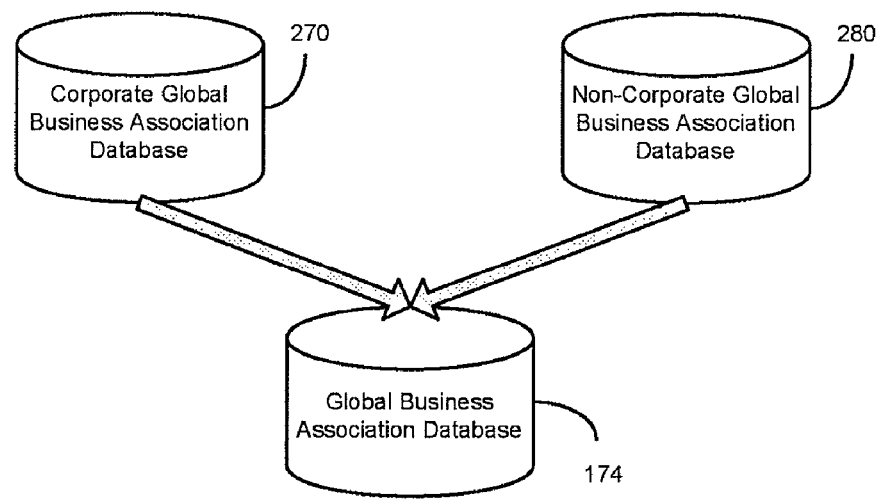
FIG. 2B shows sources of business association data in a business association database according to one embodiment.

FIG. 2B shows a diagram illustrating that in one embodiment the MBOL database 174 comprises a corporate MBOL database 270 and a non-corporate MBOL database 280. As described above, corporate and non-corporate ownership entities may be handled differently, and the associations identified according to the processes described herein may be divided along this boundary as well. In some embodiments, corporate entities and individual owners are handled in a single database or in an identical fashion.

FIGS. 3A-C are example embodiments of records 300, 310, and 320 stored in a business identification database 172. Each record stored in business identification database 172 comprises data relating to a single business and the business owner. As shown, each of the records 300, 310, and 320 correspond to the same business owner. Of course, business identification database 172 may store any number of records, and multiple records may correspond to multiple owners or to a single owner.

FIG. 3A shows business record 300 as stored in the business identification database 172. Business record 300 comprises a number of data fields related to the business and the business owner. The data fields of the business record 300 are compiled by the computing system 100 (or some other computing system) from data extracted from, for example, the business credit database 162, client 164, demographic data source 166, and business database 168.

The business record 300 comprises business identification number (BIN) field 301. In the embodiment shown, the BIN comprises a unique 14-digit identification number. For the business record 300, the business identification number is "12345678901234." In some embodiments, the BIN may be any length and may be alpha-numeric, or may be any other unique identifier.

Record 300 further comprises business name field 302. In the embodiment shown the business name is "KNOBBE MARTENS OLSON AND BEAR".

Business record 300 further comprises a number of fields 303 storing address data such as the street address, unit type, the zip code, and other related data. Additional descriptive business data 304 is also stored in business record 300, such as a primary phone number, an SIC code and description, an employee size code, years in business code, and the like. As can be seen, some of the values associated with these fields may be alpha-numeric codes. Thus, the "Years In Business Code" field has a value of 'F', and not a number. The value 'F' may correspond to a specific number of years or a range of years. It will be appreciated that there are many ways to store such data according to different embodiments.

A business owner ID field 305 is also stored in business record 300. As shown, the business owner ID 305 comprises a unique 10-digit identifier. The business owner ID in business record 300 is "1234567890." A business owner ID may be determined by the computing system 100 based on, for example, the additional data associated with the business record 300. For example, a business owner name field 306, business owner address field 307, and a social security number may be used to identify a particular record as being associated with an existing business owner ID, or a new business owner ID may be assigned. In a certain embodiment, the business owner ID is determined using the data extracted by the computing system 100 over network 160 when records are being written to the business identification database 172.

Along with information related to the business owner such as their name 306 and address 307, different credit data may be stored in the business record 300. In the record 300 shown, a credit risk field 308 is included. The credit risk shown indicates a low credit risk. Credit data may additionally or alternatively include one or more scores, credit event history information, existing account information, or the like.

FIG. 3B shows a business record 310. The business record 310 comprises the same fields as business record 300, but corresponds to a different location of the same business. The record 310 corresponds to a San Francisco, Calif. location of the business, while the record 300 corresponds to an Irvine, Calif. location.

Despite being the same business, the BIN field 301 and business name field 302 of record 310 both have different values than the corresponding fields in record 300. In this case, the difference in the name field may correspond to a variation in the name input when the record 310 was first created. As will be described below, these records represent multiple records for a single business that should be filtered so that only one business is identified in the MBOL database 172.

FIG. 3C shows a business record 320. The business record 320 comprises the same fields as 300 and 310, but corresponds to a different business. Specifically, while records 300 and 310 correspond to a law firm, record 320 corresponds to an ice cream parlor. The business owner for all three of these records is the same, as identified by the business owner ID. The business owner ID may preferably be matched to a business owner name, address, and social security number even when, as with business records 300, 310, and 320, a variation of the name is use or a different address is provided.

Figure 4:
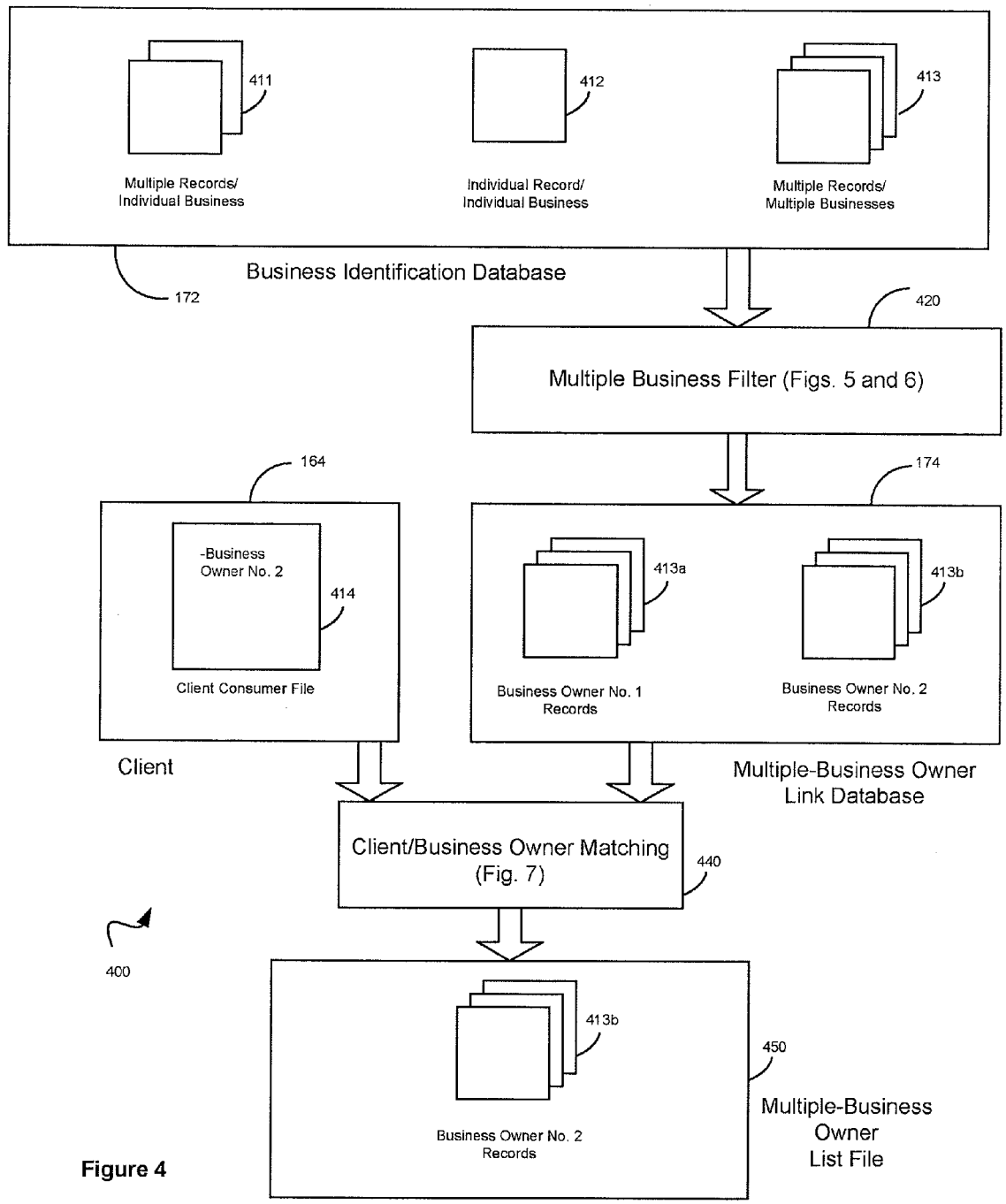
FIG. 4 is a system flow chart showing the processing of business records to determine related businesses according to one embodiment.

FIG. 4 shows a process for analyzing a business identification database 172 comprising many business records such as those shown in FIGS. 3A-C in order to determine multiple-business owners and generate a multiple-business owner list file 450. As an overview, records from a business identification database 172 are filtered by a multiple-business filter 420. The results are stored in a MBOL database 174. Results in the MBOL database 174 are matched with a client consumer file 414 and those results are used to generate a multiple-business owner list file 450.

In one embodiment, business identification database 172 comprises a large number of business records. For example, business identification database 172 may comprise on the order of 100 million business records. Each business record in the business identification database 172 includes data relating to one business. As described above, the data associated with each business may be obtained from, for example, business database 168. Additional data may be obtained from other data sources, and certain identifiers (for example, the BIN and business owner ID) may be determined by the computing system 100. Examples of business records are described above with reference to FIGS. 3A-3C.

While in some embodiments, each of the business records is associated with one business, many of the records may be associated with the same business and some of the records may be associated with the same owner. Although the records in the business identification database 172 are not necessarily sorted or organized according to the business owner, records 411, 412, and 413 are shown grouped according to the business owner for the purpose of an explanation here.

Business records 411 in the business identification database 410 comprise a set of multiple records owned by a single entity and relating to an individual business. That is, even though multiple records 411 are associated with a single business owner or ownership entity, the combined records only refer to one business. This may be the case where, for example, multiple records are created due to a slight variation in the name entered when the record was created, multiple office locations exist for a single business, or where records are related to a single event rather than all events concerning a single business. Accordingly, the owner is not a multiple-business owner.

Business records 412 are those records for which there is one individual record 412 for a single owner, and that record relates to a single business. The owner of a single business is not a multiple-business owner.

Business records 413 in business identification database 172 are those records for which multiple records are present for a single ownership entity, and those records refer to multiple businesses. Owners associated with multiple business records 413 that represent more than one business correspond to multiple-business owners. It is desired that these owners and the multiple business records 413 be identified and extracted from the business identification database 172.

In one embodiment, records in business identification database 172 are filtered by a multiple-business filter 420 in order to identify multiple business records 413. The process employed by multiple-business filter 420 is described in more detail with respect FIGS. 5 and 6 below. In general, multiple-business filter 420 accesses business identification database 172 and filters out those business records that do not comprise multiple businesses associated with an individual ownership entity. Thus, individual records 411 and multiple records 412 would be filtered out by multiple-business filter 420, while business records 413 would be kept by multiple-business filter 420. Those business records kept by multiple-business filter 420 are stored in the MBOL database 174. MBOL database 174 therefore comprises the records from business identification database 172 for which multiple businesses are associated with a single ownership entity. For example, MBOL database 174 is shown multiple business records 413a corresponding to a business owner No. 1 and multiple business records 413b corresponding to a business owner No. 2. While only two sets of records are shown, many sets of records may be stored in MBOL database 174. If the business identification database 172 comprises approximately 100 million records, then MBOL database 174 may comprise fewer records, for example approximately 10 million records. Of course, this is just one approximation and the precise number of records in each database will depend on the actual records stored in the business identification database 172.

When the MBOL database 174 has been created, a client 164 may request information related to the MBOL database 174. In general, this request will include a client consumer file 414. Client consumer file 414 may comprise a list identifying one or more consumers for which the client 164 desires multiple-business information. That is, the client 164 may be interested in learning if one or more consumers are a multiple-business owner and/or the credit status of the consumers' other businesses.

Client consumer file 414 is submitted by the client 164 to a client business owner matching module 440. For example, client 164 may submit client consumer file 414 to system 100 via network 160, and the client business owner matching module 440 may be implemented as part of the business owner link module 150. In some embodiments, the client consumer file 414 is created and submitted via a web-based user interface or proprietary software application. The process executed by the client business owner matching module 440 is described in more detail with respect to FIG. 7 below. In general, client business owner matching module 440 matches the consumers listed on the client consumer file 414 with the records contained in the MBOL database 174. For example, if client consumer file 414 includes identification information associated with business owner No. 2, then supplying the client consumer file 414 to the client business owner matching module 440 would result in multiple business records 413b associated with that owner being extracted from the multi-business owner link database 174. While in some cases every consumer identified by client consumer file 414 may have records associated therewith in the MBOL database 174, in many cases only a fraction of those names identified on a client consumer file 414 will have records in the multiple-business owner database 174. In one embodiment, the records associated with those consumers that are matched to the client consumer file 414 and the MBOL database 174 are returned in a multiple-business owner list file 450, and no data is returned for those consumers listed in client consumer file 414 but not found in MBOL database 174. The multiple-business owner list file 450 generated by the client business owner matching module 440 therefore comprises multiple business records for each of the consumers listed on the client consumer file 414 that are multiple-business owners. In FIG. 4, the client 164 is provided with multiple-business owner list file 450 comprising business owner No. 2 records 413b, but not business owner No. 1 records 413a (not requested in client consumer file 414), multiple records 411 (not associated with a multiple-business owner), or individual records 412 (not associated with a multiple-business owner). Multiple business owner list file 450 is shown with only multiple-business records 413b, but may actually comprise many records depending on client consumer file 414. For example, multiple-business owner list file 450 may comprises on the order of 100,000 records in some embodiments. In other embodiments, the multiple business owner list file 450 may only include business owner IDs or other subsets of data from the MBOL database 174.

Figure 5:
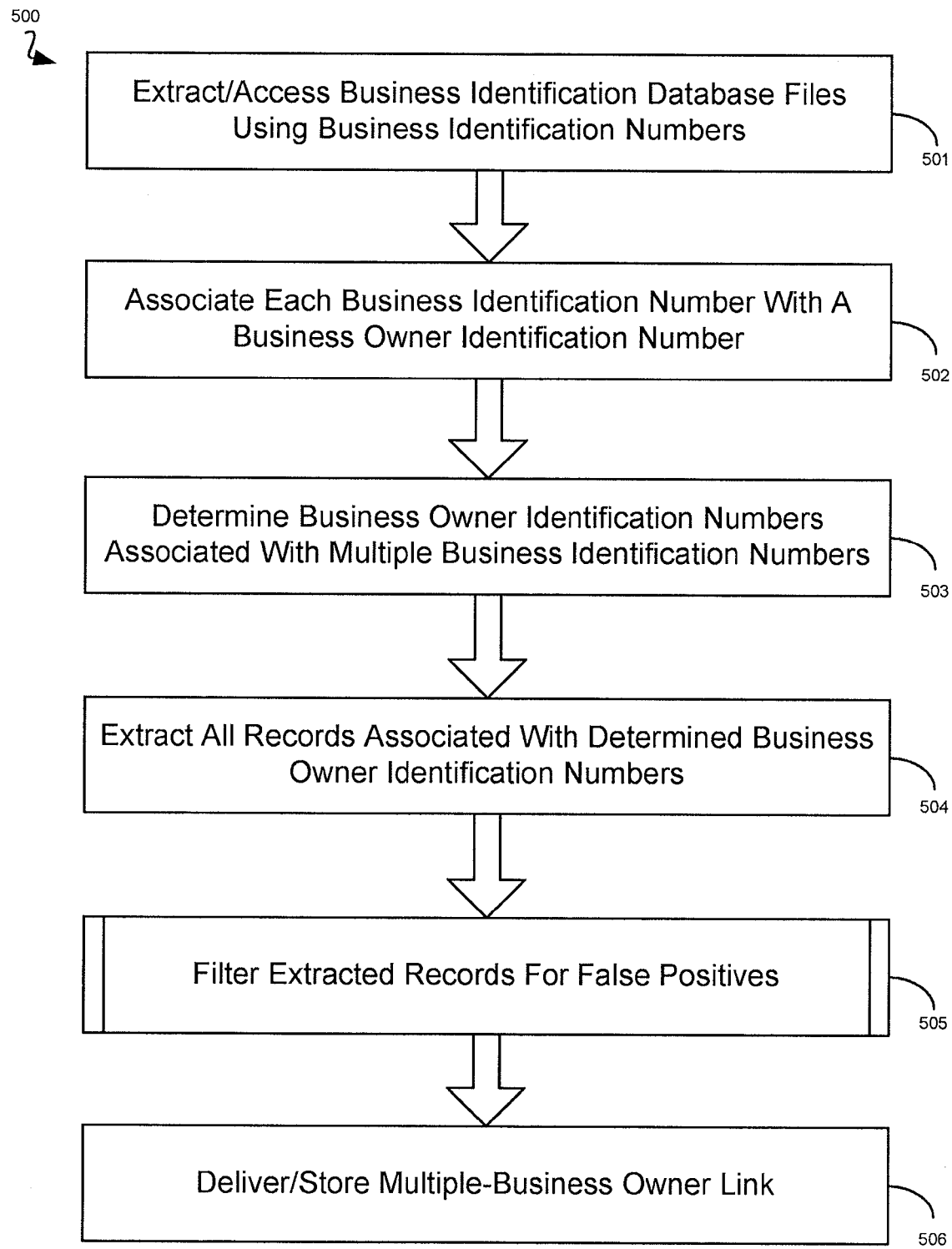
FIG. 5 is a flow chart showing a process for creating a business association database according to one embodiment.

FIG. 5 shows an example of a process 500 for filtering business identification database 174 according to one embodiment. The process 500 may be performed, for example, by the multiple-business filter 420, which may in turn be a component of the multiple-business owner link module 150.

The process 500 in FIG. 5 begins at state 501, where business identification database records are accessed and the BINs are extracted. As described above, in one embodiment each record in the business identification database 172 is associated with a BIN. At state 502, each BIN is associated with a business owner ID. Each of the business records in the business identification database includes a BIN and business owner ID. These two values for each record are extracted and associated with one another.

At state 503 it is determined whether, for each business owner ID, the business owner is associated with multiple BINs. That is, if a business owner ID is found in more than one record in the business identification database 172, then it may be associated with multiple BINs. However, if the business owner ID associated with multiple records is actually associated with only one BIN (because the same business identification number is found in multiple business identification database records), then it is not associated with multiple BINs. Referencing FIG. 4, at this stage individual records 412 are removed, along with some of the multiple records 411.

Referring to FIG. 5 at state 504, records associated with the determined business owner identification numbers from state 503 are extracted. Again with reference to FIG. 4, this corresponds with extracting the multiple-business records 413 and a portion of the multiple records 411 not identified as such by having identical BINs at state 503.

These extracted records are filtered for false positives at process state 505 of the process 500 in FIG. 5. This process state is explained in more detail below with respect to FIG. 6. In general, because business records from the business database 168 may be incomplete, redundant, or erroneous, the data contained in the records is checked to determine whether multiple records actually refer to the same business. With reference to FIG. 4, this corresponds to filtering the remaining multiple records 411.

At state 506, the remaining records are stored in the MBOL database 174. It is preferred that the MBOL database 174 comprise only true multiple-business owner records. However, as explained below, multiple-business owner records may not be identified with perfect accuracy. Therefore, the MBOL database 174 generally stores those records most likely to be multiple-business owner records, and flags at least a portion of the remaining records with a drop code. Accordingly, the additional records are stored in the MBOL database 174, but are not identified as multiple-business owner records. In other embodiments, records could be marked rather than stored in a separate database.

Figure 6:
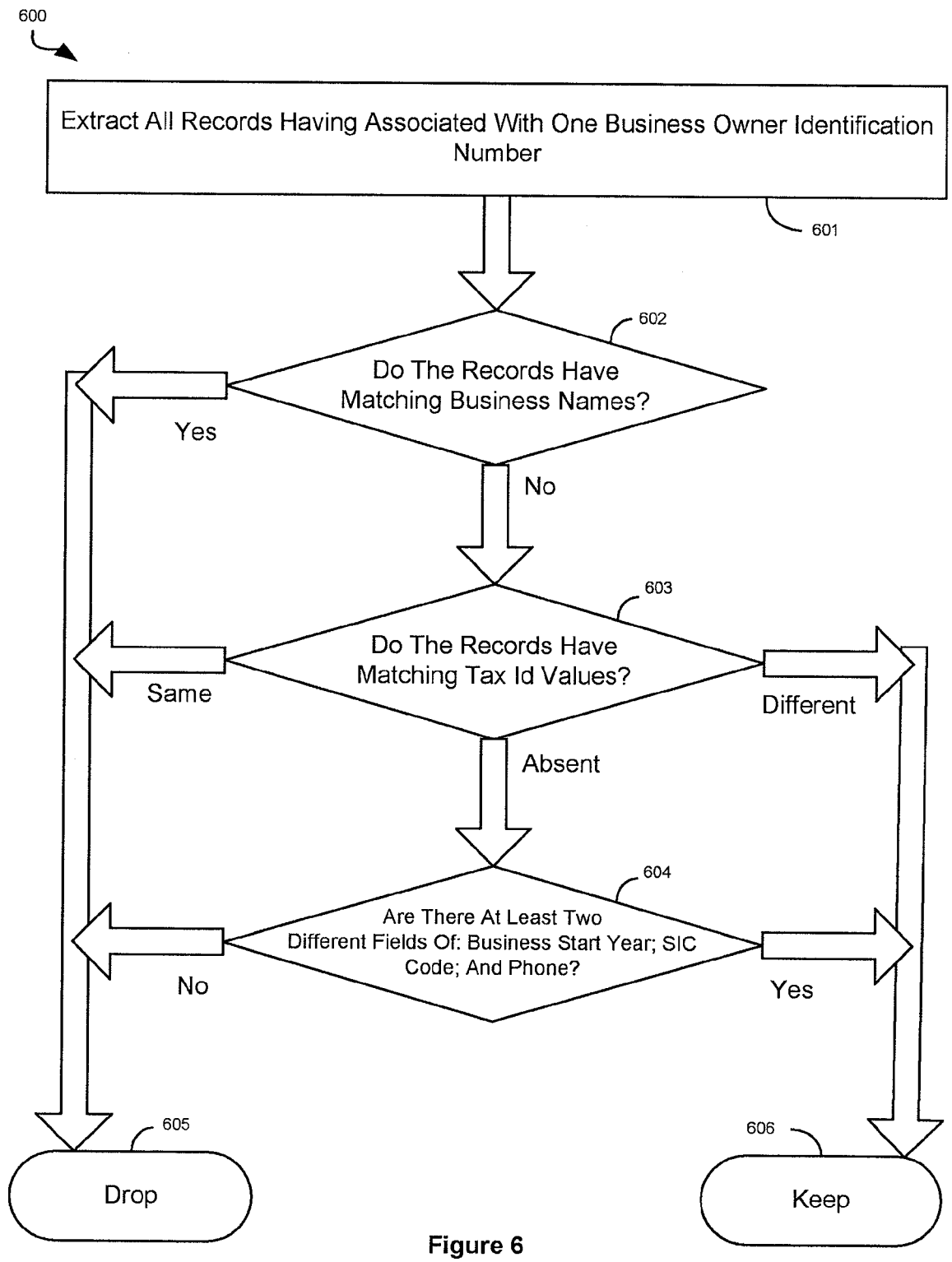
FIG. 6 is a flow chart showing a process for filtering a business association database according to one embodiment.

FIG. 6 shows one embodiment of a process for filtering false positives from a collection of potential multiple-business owner records. For example, the process 600 may be performed on records extracted from business identification database 172 for which multiple BINs are associated with a single business owner ID. Those records that are determined to be multiple business records 413 may be stored in the MBOL database 174. Records that are determined to be multiple records 411, corresponding to a single business, may also be stored, but are appended with a flag indicating the basis for determining that the records correspond to a single business.

Businesses having multiple records 411 that are actually a single business may correspond to, for example, a single business having multiple locations and/or a single business operated under multiple "doing business as" names. For example, a single business ABC Hauling may exist, and three records 411 may be present in the business identification database 172 corresponding to this single business. Two of the records may correspond to a single location with different names, such as "ABC Hauling" and "American Best Commercial Hauling." The third record may be located at a different address. Despite these differences, these three records may be identified as a single business and filtered accordingly.

The process 600 begins at state 601. A business owner ID is selected and all of the records related to that business owner ID are accessed from business identification database 172. Each of the business owner IDs corresponding to multiple BINs may be processed according to this process or a variation thereof, as will be understood by one of skill in the art. The records corresponding to each of the business owner IDs may be processed iteratively or in parallel according to different embodiments.

Next, at state 602 it is determined whether any of the selected records having the same business owner ID have matching business names. If the records do have matching business names then the records correspond to a single business and the records are dropped at state 605. If they do not have matching names then the process continues to state 603.

According to some embodiments, the business name fields in records being compared are not required to be identical in order to be considered matching names. A rule set may be applied to determine a similarity level or to determine if they meet predetermined criteria and are considered to be matching. For example, a rule set may indicate that when at least 50% of the words in the names are the identical, then the names match. Certain words and characters may be filtered out of this determination. For example, common words and literals such as 'AND', 'DDS', 'MD', '&', 'ASSOC', 'ASSOCS', 'AT', 'LAW' may be removed from consideration in the name matching process. Corporate literals such as 'LLP', 'LLC', 'CORP', and 'INC' may also be removed from the name matching process. Taking business records 300, 310, and 320 as an example for applying this rule set, the words 'KNOBBE', 'MARTENS', 'OLSON', and 'BEAR' would correspond to the name of the business record 300. Business record 310 has the words 'KNOBBE' and 'MARTENS'. Business record 320 has the words 'KNOBBE', 'ICE', 'CREAM', and 'TREATS'. Accordingly, the business records 300 and 310 share at least 50% of the words in the two names, and are determined to have matching names. Business record 320 is determined to not match either business record 300 or 310. In some embodiments, multiple records may be indirectly matched. For example, if a first record 'A' is matched to a second record 'B' but not to a third record 'C', but the record 'B' is matched to the record 'C', then 'A' may be indirectly matched to 'C' as well. Other rule sets may be used to determine whether business names match at state 602, as will be recognized by a skilled artisan.

While FIG. 6 refers to records being dropped or kept, in a preferred embodiment all of the records having different BINs but the same business owner ID are stored in the MBOL database 174, but 'dropped' records are flagged with an exception. The exception flag may identify why the record is not a multiple-business record 413. For example, records that have matching business names may be flagged indicating that they have matching business names. Thus, these records would still be available but would not be identified as a multiple business record 413. One of the flagged records may be selected to represent the single business having multiple records. For example, in FIGS. 3A-C, the owner owns two businesses ('KNOBBE MARTENS OLSON AND BEAR' and 'KNOBBE ICE CREAM TREATS'), but one business is identified twice as records 300 and 310. The process may be able to identify the fact that the owner owns two businesses, rather than dropping the owner completely or falsely identifying him as owning three businesses. One of the records 300 or 310 may be selected to represent the business having multiple records.

Moving to decision state 603, if the records do not have matching business names, it is determined whether the records related to the single business owner have matching tax ID values. If the records do have matching tax ID values, then the records represent the same business and they are dropped at state 605. As described above, in some embodiments dropped records may still be stored, but are flagged with an indication of why they do not correspond to multiple businesses. Thus, records found at state 603 to have matching tax ID values will be flagged to indicate that they have the same tax ID values. If the tax ID values are different, it is determined at state 603 that the records represent distinct businesses and the records are kept at state 606. Kept records are stored in MBOL database 174 as multiple business records 413. If at least one of the records does not indicate a tax ID, then the process 600 proceeds to decision state 604. At decision state 604 additional rules are applied to determine whether or not records associated with a single ownership entity are multiple-business records. In the example shown, it is determined whether there are at least two fields having different values, selected from three fields. The fields may be, for example the business start year, the SIC code, and the primary phone number. Of course, other fields or a different number of fields may be used, and additional or alternative rules may be applied. In the embodiment shown, if two of the selected fields do not match, then the process 600 proceeds to state 606 and those records are kept as multiple business records stored in MBOL database 174. If there are not at least two different fields from these selected fields, then the process drops (flags and stores) the records at state 605. Thus, the process 600 filters false positives (different BINs representing one business) from the MBOL database 174, allowing for a more accurate determination of multiple-business owner data.

An example of SQL code demonstrating one embodiment of a process for matching names in a filtering process is reproduced below:

```
INSERT INTO OFTB01.MBOL_UNIQUE_BUS_NAME
SELECT MBO.TRUVUE_ID, MBO.BIN, MBO.SORT_BIN, MBO.BUS_NM
FROM OFTB01.MBOL_BUS_NAME MBO
WHERE MBO.BIN NOT IN (SELECT BIN FROM
    (
        SELECT T1.BIN,
            T1.SORT_BIN,
            T1.TRUVUE_ID,
```

-continued

```
        T1.BUS_NM,
        DEC(T1.WORD_CT, 5, 2) as WORD_CT,
        T2.BIN as BIN2,
        DEC(SUM(((CASE when T1.WORD1 IN (T2.WORD1, T2.WORD2,
T2.WORD3, T2.WORD4, T2.WORD5, T2.WORD6, T2.WORD7, T2.WORD8)
            AND T1.WORD1 NOT IN (' ', 'LLC', 'LLP', 'CORP',
        'CORPORATION', 'CO', 'ORGANIZATION', 'ORG', 'INCORPORATED',
        'INC', 'LAW', 'MD', 'DDS', '&', 'AND', 'ASSOC', 'ASSOCS',
        'ASSOCOATION', 'AT', 'DR', 'DOCTOR', '/', '|', '#', '+',
        '$', '%', '-', '.', 'Ö', '\') THEN 1 ELSE 0 END) +
                (CASE when T1.WORD2 IN (T2.WORD1, T2.WORD2, T2.WORD3,
T2.WORD4, T2.WORD5, T2.WORD6, T2.WORD7, T2.WORD8)
            AND T1.WORD2 NOT IN (' ', 'LLC', 'LLP', 'CORP',
        'CORPORATION', 'CO', 'ORGANIZATION', 'ORG', 'INCORPORATED',
        'INC', 'LAW', 'MD', 'DDS', '&', 'AND', 'ASSOC', 'ASSOCS',
        'ASSOCOATION', 'AT', 'DR', 'DOCTOR', '/', '|', '#', '+',
        '$', '%', '-', '.', 'Ö', '\') THEN 1 ELSE 0 END) +
                    (CASE when T1.WORD3 IN (T2.WORD1, T2.WORD2,
T2.WORD3, T2.WORD4, T2.WORD5, T2.WORD6, T2.WORD7, T2.WORD8)
            AND T1.WORD3 NOT IN (' ', 'LLC', 'LLP', 'CORP',
        ' CORPORATION', 'CO', 'ORGANIZATION', 'ORG', 'INCORPORATED',
        'INC', 'LAW', 'MD', 'DDS', '&', 'AND', 'ASSOC', 'ASSOCS',
        'ASSOCOATION', 'AT', 'DR', 'DOCTOR', '/', '|', '#', '+',
        '$', '%', '-', '.', 'Ö', '\') THEN 1 ELSE 0 END) +
            (CASE when T1.WORD4 IN (T2.WORD1, T2.WORD2, T2.WORD3,
T2.WORD4, T2.WORD5, T2.WORD6, T2.WORD7, T2.WORD8)
            AND T1.WORD4 NOT IN (' ', 'LLC', 'LLP', 'CORP',
        'CORPORATION', 'CO', 'ORGANIZATION', 'ORG', 'INCORPORATED',
        'INC', 'LAW', 'MD', 'DDS', '&', 'AND', 'ASSOC', 'ASSOCS',
        'ASSOCOATION', 'AT', 'DR', 'DOCTOR', '/', '|', '#', '+',
        '$', '%', '-', '.', 'Ö', '\') THEN 1 ELSE 0 END) +
            (CASE when T1.WORD5 IN (T2.WORD1, T2.WORD2, T2.WORD3,
T2.WORD4, T2.WORD5, T2.WORD6, T2.WORD7, T2.WORD8)
            AND T1.WORD5 NOT IN (' ', 'LLC', 'LLP', 'CORP',
        'CORPORATION', 'CO', 'ORGANIZATION', 'ORG', 'INCORPORATED',
        'INC', 'LAW', 'MD', 'DDS', '&', 'AND', 'ASSOC', 'ASSOCS',
        'ASSOCOATION', 'AT', 'DR', 'DOCTOR', '/', '|', '#', '+',
        '$', '%', '-', '.', 'Ö', '\') THEN 1 ELSE 0 END) +
            (CASE when T1.WORD6 IN (T2.WORD1, T2.WORD2, T2.WORD3,
T2.WORD4, T2.WORD5, T2.WORD6, T2.WORD7, T2.WORD8)
            AND T1.WORD6 NOT IN (' ', 'LLC', 'LLP', 'CORP',
        'CORPORATION', 'CO', 'ORGANIZATION', 'ORG', 'INCORPORATED',
        'INC', 'LAW', 'MD', 'DDS', '&', 'AND', 'ASSOC', 'ASSOCS',
        'ASSOCOATION', 'AT', 'DR', 'DOCTOR', '/', '|', '#', '+',
        '$', '%', '-', '.', 'Ö', '\') THEN 1 ELSE 0 END) +
            (CASE when T1.WORD7 IN (T2.WORD1, T2.WORD2, T2.WORD3,
T2.WORD4, T2.WORD5, T2.WORD6, T2.WORD7, T2.WORD8)
            AND T1.WORD7 NOT IN (' ', 'LLC', 'LLP', 'CORP',
        'CORPORATION', 'CO', 'ORGANIZATION', 'ORG', 'INCORPORATED',
        'INC', 'LAW', 'MD', 'DDS', '&', 'AND', 'ASSOC', 'ASSOCS',
        'ASSOCOATION', 'AT', 'DR', 'DOCTOR', '/', '|', '#', '+',
        '$', '%', '-', '.', 'Ö', '\') THEN 1 ELSE 0 END) +
                (CASE when T1.WORD8 IN (T2.WORD1, T2.WORD2,
T2.WORD3, T2.WORD4, T2.WORD5, T2.WORD6, T2.WORD7, T2.WORD8)
            AND T1.WORD8 NOT IN (' ', 'LLC', 'LLP', 'CORP',
        'CORPORATION', 'CO', 'ORGANIZATION', 'ORG', 'INCORPORATED',
        'INC', 'LAW', 'MD', 'DDS', '&', 'AND', 'ASSOC', 'ASSOCS',
        'ASSOCOATION', 'AT', 'DR', 'DOCTOR', '/', '|', '#', '+',
        '$', '%', '-', '.', 'Ö', '\') THEN 1 ELSE 0 END)), 5, 2)
            as MATCH_CT
            FROM   OFTB01.MBOL_BUS_NAME T1,
                   OFTB01.MBOL_BUS_NAME T2
            WHERE T1.TRUVUE_ID = T2.TRUVUE_ID
            AND    T1.BIN <> T2.BIN
            GROUP BY T1.TRUVUE ID, T1.BIN, T1.SORT_BIN,
T1.BUS_NM, T1.WORD_CT, T2.BIN
) MATCHES
WHERE (WORD_CT/2 <= MATCH CT))
```

Figure 7:
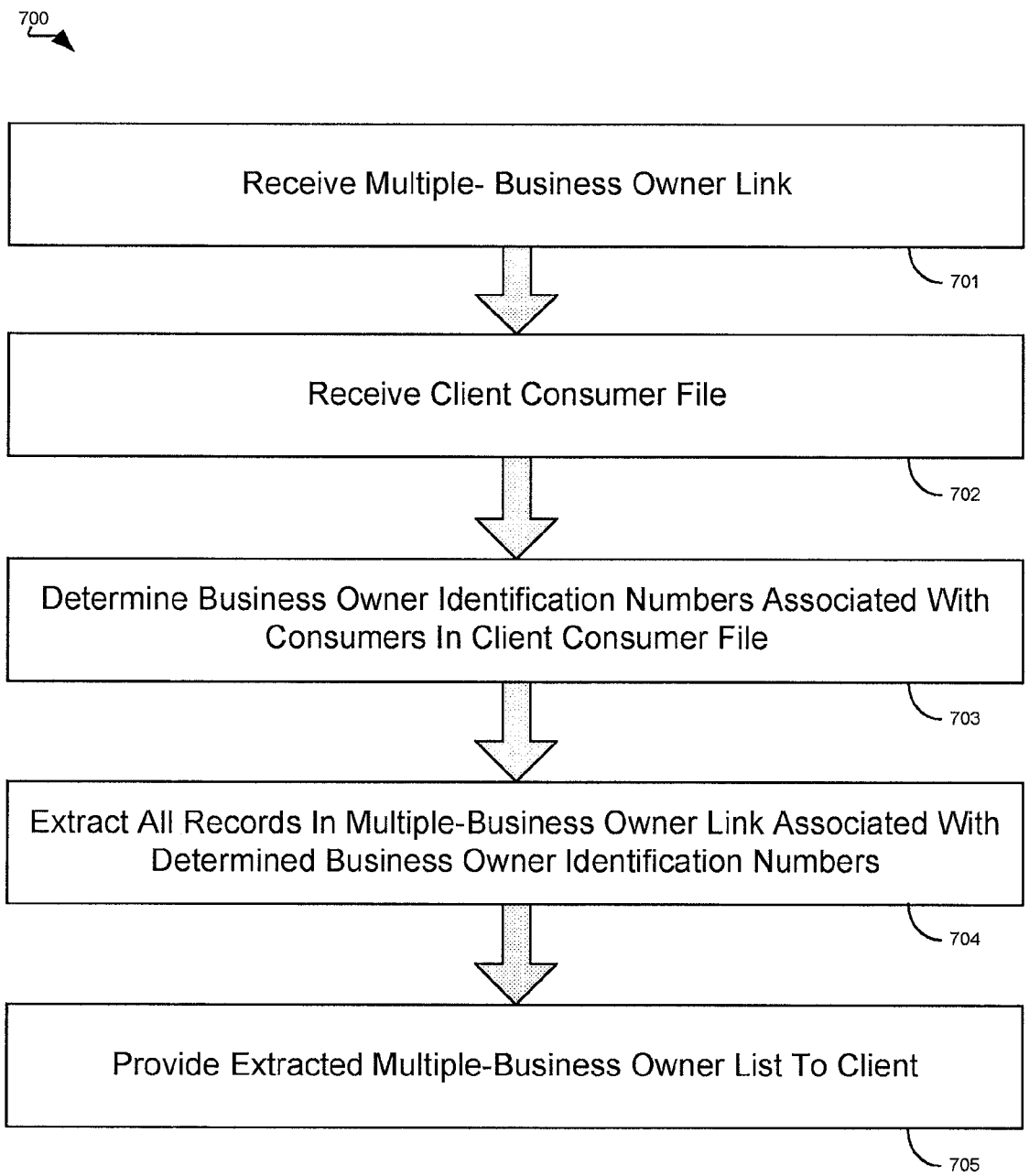
FIG. 7 is a flow chart showing a process for creating a multiple-business owner list file according to one embodiment.

FIG. 7 shows one embodiment of a process for delivering a multiple-business owner list file 450 to a client 164. Process 700 begins at state 701 where the MBOL database 174 is accessed. As described above, MBOL database 174 may comprise multiple business records 413 along with flagged (dropped) multiple records 411. In FIG. 4, the MBOL database 174 is shown with multiple-business records 413*a* and 413*b*.

At state 702, a client consumer file 414 is received. A client consumer file 414 may comprise, for example, a list of consumers for which multiple-business data is desired. The consumers may be identified by name, address, or any other identifying characteristic.

The process 700 then continues to state 703 where business owner IDs are associated with the consumers identified in the client consumer file 414. The consumers are identified with the business owner IDs by matching the data provided for each consumer with data stored by computing system 100. For example, a name and/or an address may be matched to a file stored in memory 130 or mass storage 120 of the computing device 100. A skilled artisan will recognize that certain data may not be necessary, and that a number of different logical rules can be implemented to determine when a business owner ID is associated with a consumer in a client consumer file 414.

At state 704, records in a MBOL database 174 that are associated with the determined business owner IDs from state 703 are extracted. At state 705, these extracted records are provided to the client. The extracted records may be provided in a multiple-business owner list file 450. The multiple business owner list file 450 comprises, in some embodiments, a list of multiple-business records 413 or a subset of the data in the multiple-business records 413 grouped according to the business owner ID. In some embodiments, the extracted records may be provided in an electronic or hardcopy report. The extracted records may be provided with a user interface available through a web page.

Figure 8:
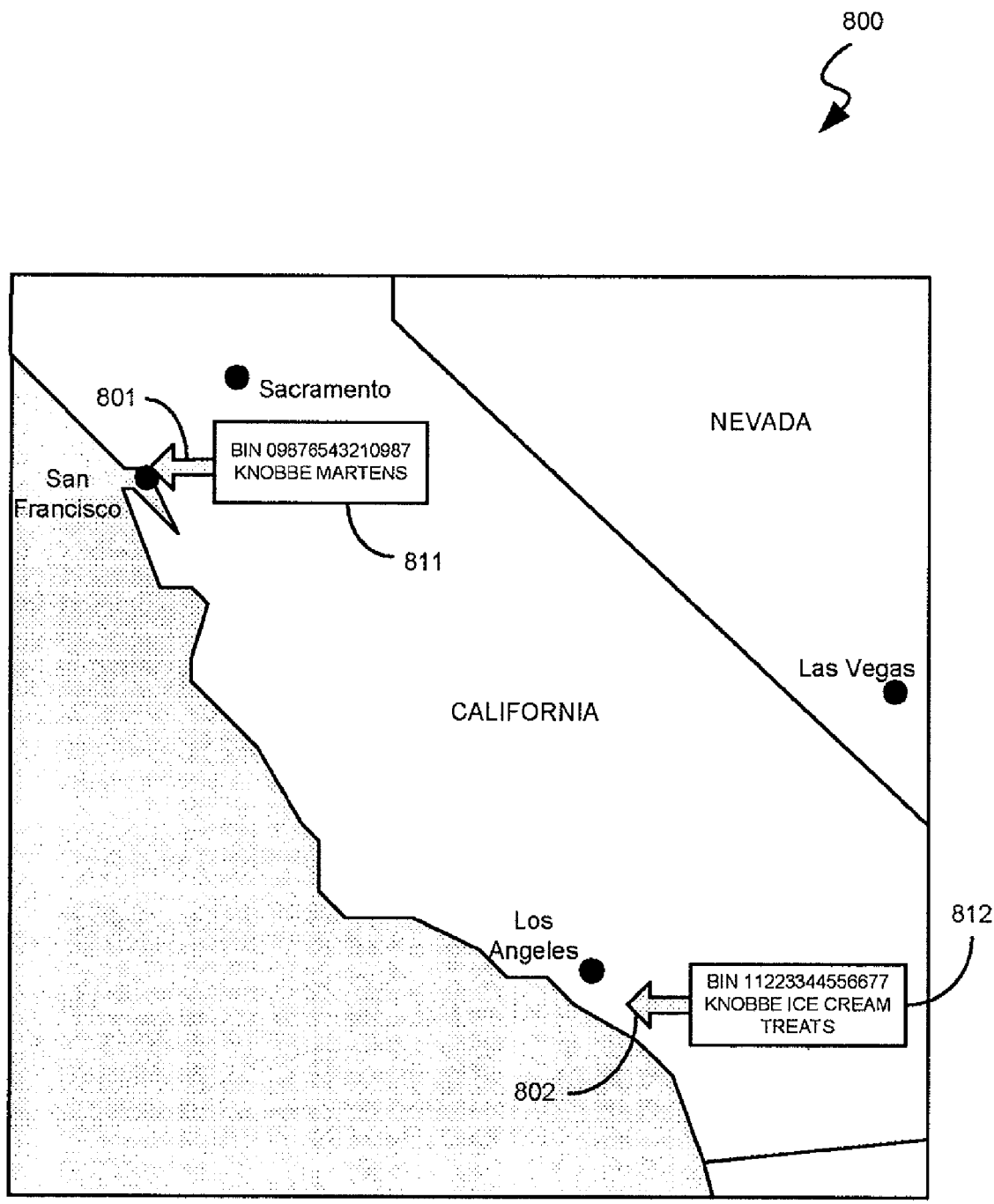
FIG. 8 is a visual representation of multiple businesses owned by a multiple-business owner according to one embodiment.

FIG. 8 shows one embodiment of a map 800 that is displayed by a user interface and that may be used to show the relationship between a business owner and multiple businesses. In some embodiments, the user interface is accessible to client 164 using a proprietary software application or a web browser application. The map 800 may be created by accessing data stored in the multiple-business owner list file 450. Map 800 includes identifying pointers 801 and 802, which identify the business locations of the businesses identified by the business records 310 and 320 shown in FIGS. 3B and 3C. Address data may be extracted from the records to identify the geographic location on the map. As shown, business record 300 is not displayed because it is the same business identified by record 310 (even though it is at a different location). In some embodiments, all records are displayed, and those referring to duplicate businesses are identified, such as by a color code. Next to the pointers 801 and 802 are identifying text boxes 811 and 812. The identifying text box includes a business identification number and the business name. Other data from the business records may be displayed as well, such as a phone number, address, credit data, or the like.

FIG. 9 shows another type of report that can be generated according to some embodiments. Report 900 comprises a waterfall report that identifies the number of multiple records 411 filtered and the drop criteria 905 for those records. Report 900 comprises a number of attributes 901 that identify potential drop criteria. As shown, the potential drop criteria are the BIN 911, the business name 912, the tax ID 913, and various combinations of the start year, SIC code, and phone 914. Each criteria 901 is in an order in which the filter was applied according to the embodiment shown, so that a running count 902 of the records remaining is kept, along with a corresponding percentage 904. The number of records dropped for each drop criteria 905 is also listed in the report 900. The drop criteria field 905 provides a textual description of the reason for dropping the records. A total 920 is provided in the report corresponding to the entire filtering process.

FIG. 10 shows a distribution report 1000 according to some embodiments. Distribution report 1000 provides the number of owners 1002 and the total number of businesses 1003 broken down by the number of businesses owned 1001 by a business owner. In the example shown, fields 1005 correspond to between two and seven businesses owned by a single business owner. A total field 1006 shows that there are 27,500 total business owners represented by the records in the MBOL database, and those owners own a total of 100,000 businesses.

Although the foregoing invention has been described in terms of certain embodiments, other embodiments will be apparent to those of ordinary skill in the art from the disclosure herein. Moreover, the described embodiments have been presented by way of example only, and are not intended to limit the scope of the inventions. Indeed, the novel methods and systems described herein may be embodied in a variety of other forms without departing from the spirit thereof. Accordingly, other combinations, omissions, substitutions and modifications will be apparent to the skilled artisan in view of the disclosure herein.

What is claimed is:

1. A computer implemented method for filtering a business database comprising a plurality of records to determine which of the records correspond to multiple business entities having a common business owner, each of the records in the business database comprising a business owner field and a plurality of other identifying fields associated with a business reflected in the record, the method comprising the steps of:

for one or more of the plurality of records in the business database:
designating a record as a selected record, the selected record associated with a business owner;
determining whether any of the other of the plurality of records are associated with the business owner;
extracting the selected record and each of the other records determined to be associated with the business owner in response to determining that there are other records associated with the business owner;
generating a multiple-business owner data set from the extracted records, the multiple-business owner data set comprising a plurality of sets of multiple-business records, the multiple-business records in each set being associated with a multiple-business owner;
excluding, from each set of multiple-business records, one or more records that are not distinct from at least one other record in the set in that they do not reflect distinct businesses from those reflected in the other records in the set, wherein a record in a set that does not reflect a distinct business from those reflected in other records in the set is identified by at least:
determining that a business name in the record is the same as or meets a similarity threshold for a business name in any other record in the set;
in response to determining that the business name in the record is not the same as or does not meet a similarity threshold for a business name in any other record in the set, determining that a tax identifier in the record is the same as a tax identifier in any other record in the set; and
in response to determining that the tax identifier in the record is not the same as a tax identifier in any other record in the set, determining that information in two or more of the following identifying fields in the record is the same as that in corresponding identifying fields in any other record in the set:
a start year of the business reflected in the record;
a standard industrial classification (SIC) code of the business reflected in the record; and
a phone number of the business reflected in the record;
storing, in a multiple-business owner link database, the multiple-business owner data set comprising the multiple-business records not excluded by the excluding; and delivering at least a portion of the multiple-business owner data set to a client requesting the multiple-business owner data set, wherein the method is performed in its entirety by a computing system that comprises one or more computing devices.

2. The computer implemented method of claim 1, wherein the similarity threshold is met when a business name in a record includes 50% or more words that are the same as those in a business name of another record.

3. The computer implemented method of claim 1, wherein delivering the at least a portion of the multiple-business owner data set comprises matching the records in the multiple-business owner data set to records in a client consumer file.

4. The computer implemented method of claim 1, wherein the business database includes corporate data and non-corporate data.

5. The computer implemented method of claim 1, wherein the at least a portion of the multiple-business owner data set includes business owner identification information.

6. The computer implemented method of claim 1, further comprising generating a report for the client indicating a number of businesses owned by common owners within the at least a portion of the multiple-business owner data set.

7. A storage medium having a computer program stored thereon for causing a suitably programmed system to process computer-program code by performing the computer implemented method of claim 1 when such program is executed on the system.

8. The computer implemented method of claim 3, wherein each of the records in the client consumer file comprises business owner data corresponding to at least one business owner.

9. The computer implemented method of claim 8, wherein matching the multiple-business owner data set comprises determining, within the multiple-business owner data set, records with data in the business owner field that correspond to the business owner data in the records in the client consumer file.

10. A computing system comprising:
a business database comprising a plurality of business records, each business record comprising a business owner field and field a plurality of other identifying fields associated with a business reflected in the business record, the business owner field of each business record containing information about a owner of the business reflected in the business record;
a multiple-business owner filter being configured to access the business database and select a subset of the plurality of business records, the subset comprising a plurality of sets of multiple-business records, the multiple-business records in each set being associated with a single business ownership entity comprising a multiple-business owner, wherein each business record in each set of multiple-business records has the same or similar information in the business owner field;
a false-positive filter being configured to exclude, from each set of multiple-business records, one or more business records that are not distinct from at least one other business record in the set in that they do not reflect distinct businesses from those reflected in the other business records in the set,
the false-positive filter being further configured to identify, in a set of multiple-business records, a business record that does not reflect a distinct business from those reflected in the other business records in the set by at least:
determining that a business name in the business record is the same as or meets a similarity threshold for a business name in any other business record in the set;
in response to determining that the business name in the business record is not the same as or does not meet a similarity threshold for a business name in any other business record in the set, determining that a tax identifier in the business record is the same as a tax identifier in any other business record in the set; and
in response to determining that the tax identifier in the business record is not the same as a tax identifier in any other business record in the set, determining that information in two or more of the following identifying fields in the business record is the same as that in corresponding identifying fields in any other business record in the set:
a start year of the business reflected in the business record;
a standard industrial classification (SIC) code of the business reflected in the business record; and
a phone number of the business reflected in the business record; and
a multiple-business owner link database being configured to store the multiple-business records not excluded by the false-positive filter.

11. The computing system of claim 10, further comprising a client matching module being configured to receive a consumer file from a client and extract records from the multiple-business owner link database matching information in the consumer file.

12. The computing system of claim 10, wherein the business database includes corporate data and non-corporate data.

13. The computing system of claim 10, further comprising a report module being configured to generate a report related to the multiple-business owner link database, the report comprising a number of businesses owned by a common owner.

14. The computing system of claim 10, wherein the similarity threshold is met when a business name in a business record includes 50% or more words that are the same as those in a business name of another business record.

15. The computing system of claim 11, wherein the consumer file comprises business owner data corresponding to at least one business owner.

16. The computing system of claim 15, wherein the matching records comprise business records with data in the business owner field that correspond to the business owner data in the consumer file.

17. The computing system of claim 11, wherein the client matching module is further configured to provide at least a subset of the data in the matching records to the client.

18. The computing system of claim 17, wherein the at least a subset of the data in the matching records provided to the client includes at least one of the identifying fields.

* * * * *

UNITED STATES PATENT AND TRADEMARK OFFICE
CERTIFICATE OF CORRECTION

PATENT NO. : 7,912,865 B2  
APPLICATION NO. : 11/862086  
DATED : March 22, 2011  
INVENTOR(S) : Kevin J. Akerman and Denise S. Hopkins It is certified that error appears in the above-identified patent and that said Letters Patent is hereby corrected as shown below:

Title page 2, item [56] column 1, line 53 (approx.) in U.S. Patent Documents, please add --2004/0220896--

Title page 2, item [56] column 2, line 53 (approx.) in U.S. Patent Documents, please add --11/2004--

Title page 2, item [56] column 3, line 53 (approx.) in U.S. Patent Documents, please add --Fei, et al.--

At column 17, line 46 (approx.), in Claim 10, please change "and field" to --and--.

Signed and Sealed this  
Third Day of January, 2012

David J. Kappos  
*Director of the United States Patent and Trademark Office*